United States Patent
Klamp

[15] 3,659,530
[45] May 2, 1972

[54] TOW TRUCK CONVEYOR SYSTEM

[72] Inventor: Paul Klamp, St. Clair Shores, Mich.
[73] Assignee: American Chain & Cable Company, Inc., New York, N.Y.
[22] Filed: Sept. 21, 1965
[21] Appl. No.: 488,922

[52] U.S. Cl. .................................................. 104/172 BT
[51] Int. Cl. ........................................................ B65g 17/42
[58] Field of Search ......................................... 104/172, 178

[56] References Cited

UNITED STATES PATENTS

| 3,094,944 | 6/1963 | Bradt | 104/172 |
| 3,103,895 | 9/1963 | Bradt | 104/178 X |

*Primary Examiner*—Arthur L. La Point
*Assistant Examiner*—Robert Saifer
*Attorney*—Barnes, Kisselle, Raisch & Choate

[57] ABSTRACT

The tow truck conveyor system disclosed herein comprises a conveyor mounted for movement along a slot and a plurality of trucks. Each truck has a truck body and means thereon movable through the slot into and out of engagement with the conveyor. A front bumper is movably mounted on the truck body and operatively connected with the conveyor engaging means so that when the front bumper is moved rearwardly by contact with an obstacle, the conveyor engaging means is moved out of engagement with the conveyor. A rear bumper is movably mounted on the truck body and operatively connected with the front bumper so that the rear bumper is moved into position for engagement with the front bumper of a successive truck when the front bumper of the truck engages an obstacle. Each truck further includes means operable by engagement of the truck with a preceding truck that has encountered an obstacle to engage the front bumper of the truck and prevent forward movement of the front bumper when the rear bumper of a preceding truck in advance of said truck moves forwardly due to the removal of the obstacle in the path of the front bumper of the preceding truck.

12 Claims, 8 Drawing Figures

Patented May 2, 1972 3,659,530

INVENTOR.
PAUL KLAMP
BY
Barnes, Kisselle, Laisch & Choate
ATTORNEYS

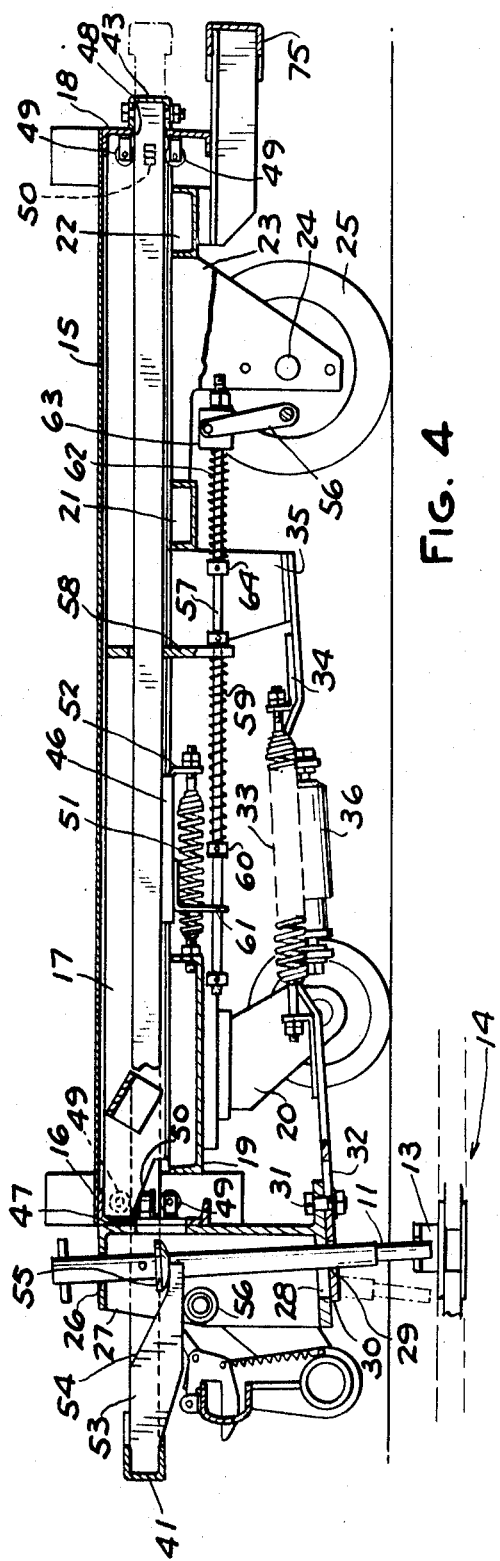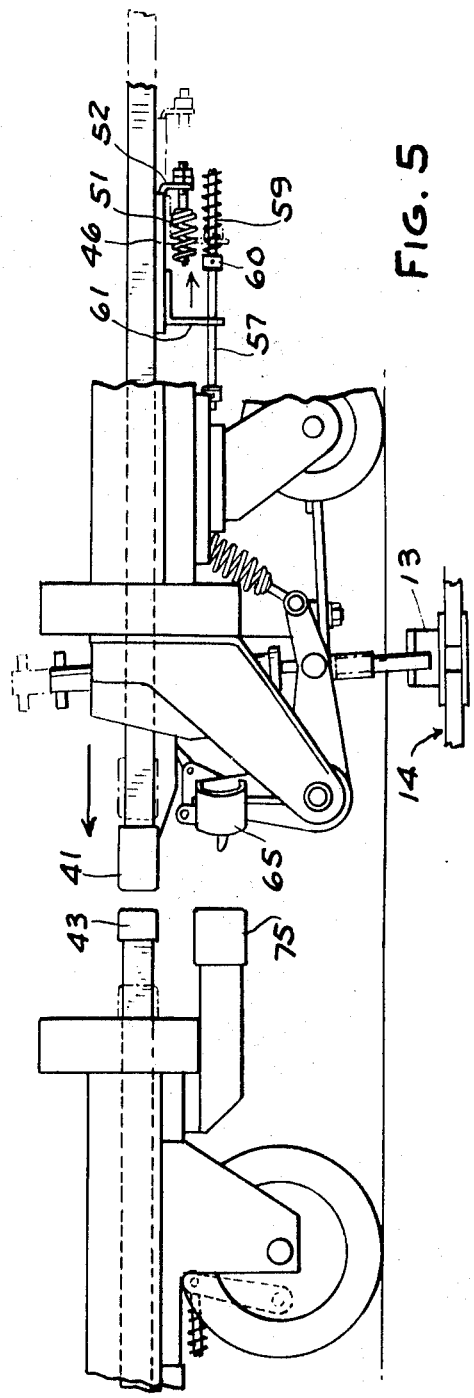
INVENTOR.
PAUL KLAMP
BY
Barnes, Kisselle, Raisch & Choate
ATTORNEYS

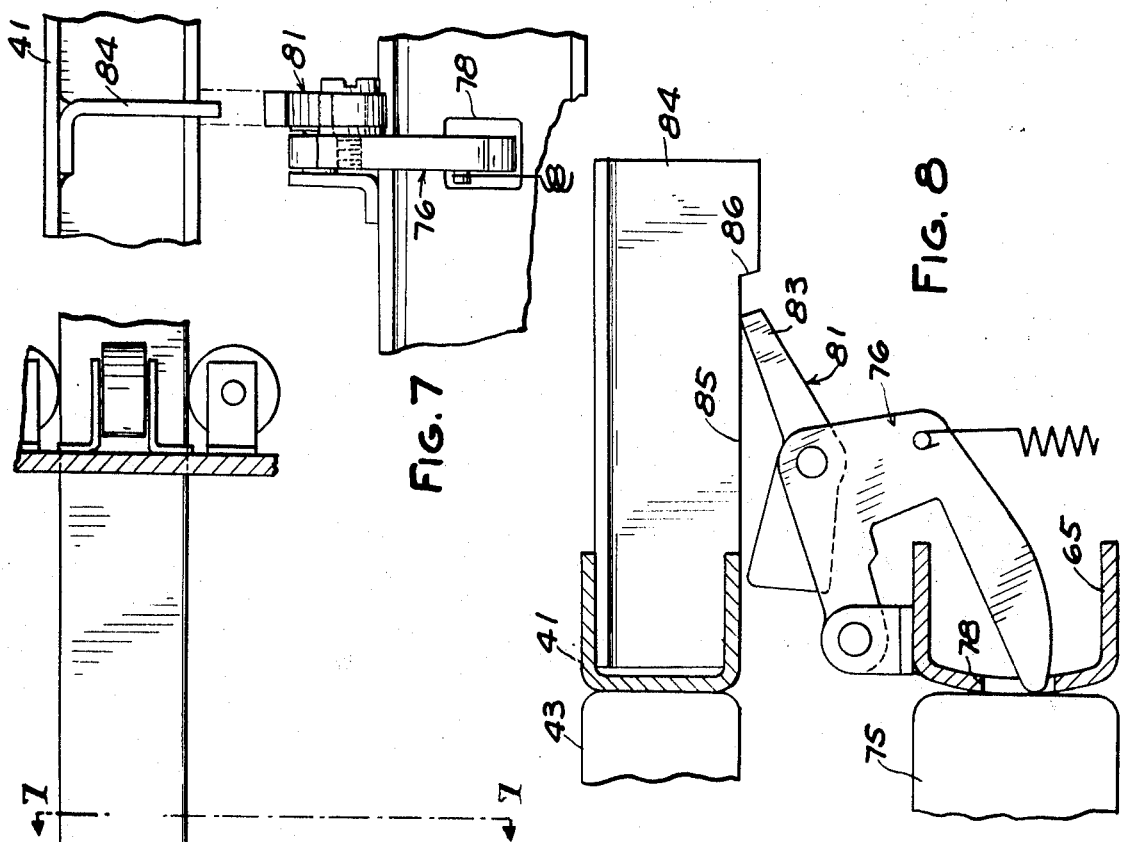
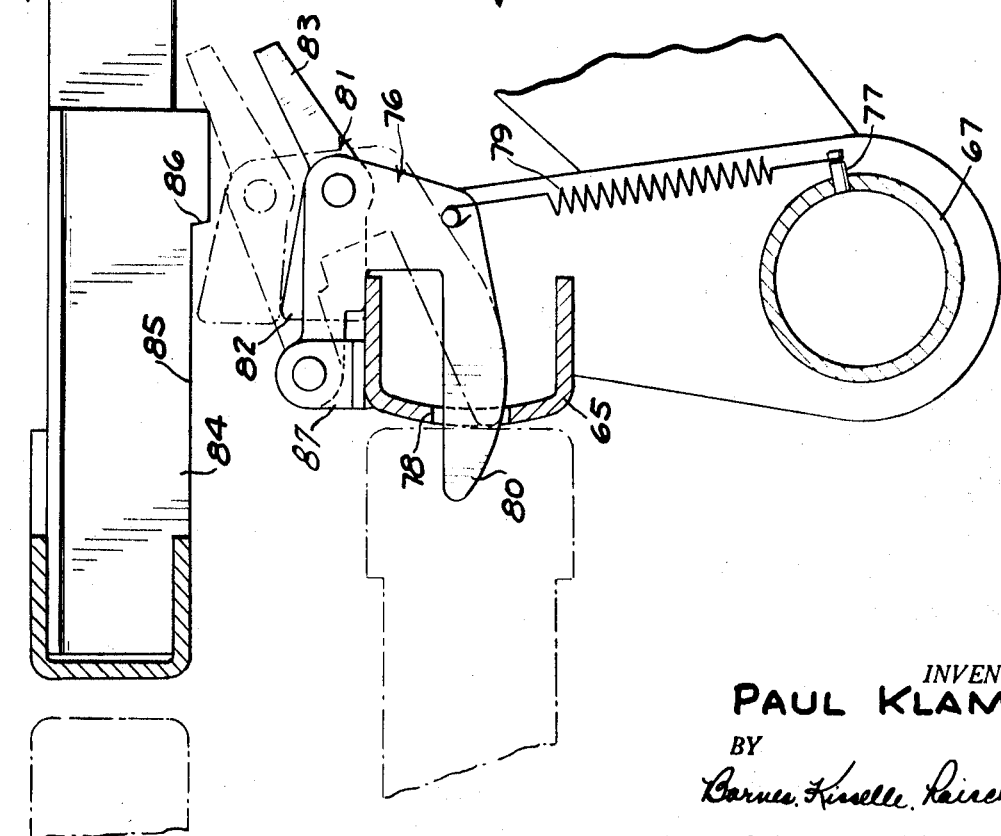

TOW TRUCK CONVEYOR SYSTEM

This invention relates to conveyor systems and particularly to tow truck conveyor systems.

In tow truck conveyor systems, a plurality of tow trucks are adapted to be moved along a slot in the floor by engagement of a tow pin on the tow truck with a conveyor beneath the floor. It has heretofore been suggested that structure be provided for permitting the tow trucks to accumulate when an obstacle is encountered. Conventionally, such a structure comprises a front bumper movably mounted on the front of each tow truck and adapted to be moved rearwardly and thereby lift the tow pin. As the front bumper of a leading truck encounters an obstacle, the front bumper moves rearwardly to lift the tow pin and to move a rear bumper into position for engagement with the front bumper of a succeeding truck. Similarly, as each succeeding truck approaches the first or leading truck, the front bumper thereof engages the rear of the leading truck to lift the tow pin of the succeeding truck.

One of the problems with such an accumulating system is that when the obstacle in front of the leading truck is removed, the rear bumper of the leading truck will move away from the front bumper of the succeeding truck permitting the front bumper of the succeeding truck, and in turn each succeeding truck, to move forwardly so that all tow pins will drop at one time and the tow trucks will not be picked up by the conveyor chain in a successive manner.

In addition, it is desirable that the trucks also be adapted to accumulate against another truck or to push it depending on whether the leading truck is stopped through the action of its accumulation bumper or whether it is standing free, as in the case when the chain has pushed the truck into a non-powered spur line. In this case, the first truck is powered into the spur until its tow pin is free of the chain pusher dog. After this it coasts to a stop. In this position it is in the way of the main line traffic, and it is the function of a truck approaching from behind to push it into the spur line until it is clear of the main line traffic. If the trucks were purely accumulating trucks, this could not be done. One truck after another approaching this area would stop, thus producing an intolerable situation.

The pushing of trucks by another is not limited to a single truck, so that several trucks can be pushed into the spur line. The rearmost of the stationary trucks is pushed by an approaching truck and, in turn, pushes one or more trucks ahead of it. The trucks, in this case, function exactly as if they had no accumulation feature at all.

If, however, a truck approaches another which had its accumulation bumper pushed backwards by either a floor stop or any other obstruction, or by an accumulated truck, the approaching truck should automatically become an accumulating truck.

It is therefore an object of this invention to provide an accumulating and pusher type tow truck conveyor system wherein the tow trucks are constructed in such a manner that after an obstacle is removed, the tow trucks are successively picked up and moved along by the conveyor.

It is a further object of the invention to provide a tow truck conveyor system wherein the tow truck is relatively simple in construction, rigid and strong, and can be manufactured at relatively low cost.

In the drawings:

FIG. 4 is a sectional view taken along the line 4—4 in FIG. 1.

FIG. 5 is a fragmentary side elevational view showing the relative positions of two trucks, the leading truck having been stopped by an encounter with an obstacle and the succeeding truck being about to contact the leading truck.

FIG. 6 is a fragmentary sectional view taken along the line 6—6 in FIG. 1.

FIG. 7 is a fragmentary sectional view taken along the line 7—7 in FIG. 6.

FIG. 8 is a view similar to FIG. 6 showing the relative positions of the parts after engagement of a succeeding truck with a leading truck.

Figure 1:
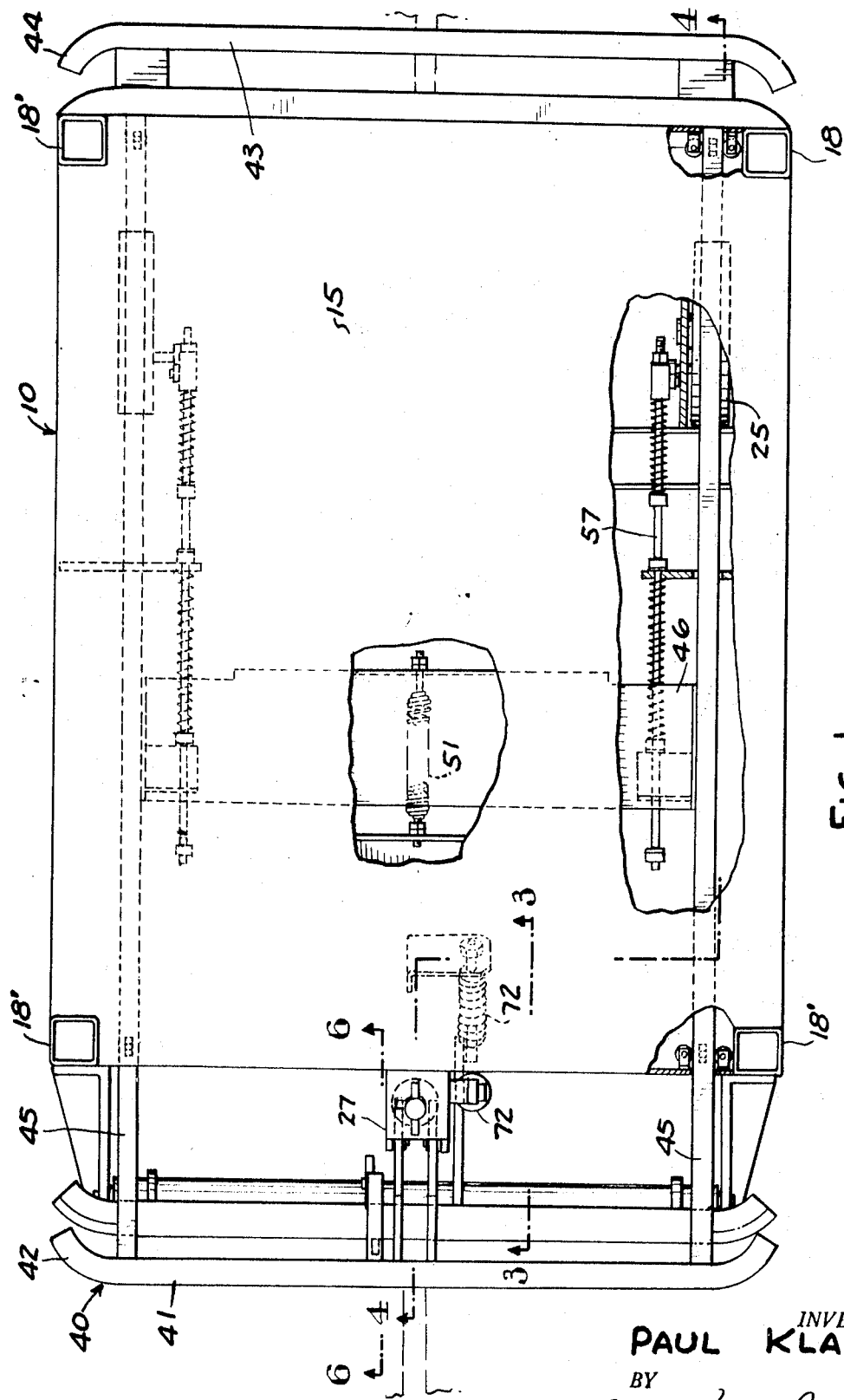
FIG. 1 is a part sectional plan view of a tow truck embodying the invention.

Referring to FIGS. 1–4, the tow truck conveyor system embodying the invention comprises a plurality of wheeled tow trucks 10, each of which has a tow pin 11 that extends downwardly into a slot 12 and is engaged by a lug 13 on a conveyor chain 14 beneath the floor to pull the tow truck along the slot.

The tow truck 10 comprises a body which includes a flat plate 15 that is welded on a frame comprising a front member 16, side members 17, a rear member 18 and corner posts 18'. Front and rear members 16, 18 are channel shaped in cross section and side members 17 are angle shaped in cross section. A transverse channel shaped member 19 extends between side members 17 across the front of the frame and caster wheels 20 are mounted on the underside of the member 19. A pair of channel shaped members 21, 22 are provided adjacent the rear of the frame and brackets 23 extend downwardly therefrom to support an axle 24 on which wheels 25 are mounted.

The tow pin 11 is mounted for vertical sliding movement at the front end of the truck body in an opening 26 of a bracket 27. The lower end of the tow pin 11 extends through an elongated opening 28 in the bracket 27 and a circular opening 29 in a link 30 that is slidably mounted for longitudinal movement on the lower end of the bracket 27 by a bolt 31 that extends through an elongated slot 32 in the link. The link 30 is connected to a pair of tension springs 33 which in turn have their ends fixed to a bracket 34 fastened to the body of the truck by plates 35. A shock absorber 36 extends between the link 30 and the bracket 34. The arrangement is such that the springs 33 provide for some limited yielding movement of the tow pin 11 when the lug 13 on the conveyor chain engages the tow pin to thereby minimize the shock. The shock absorber 36 is interrelated with the function of the springs to minimize the shock, all as disclosed and claimed in the U.S. Pat. to Klamp 3,015,284.

Referring to FIGS. 1 and 4, a bumper assembly 40 is slidably mounted within the body of the truck and includes a channel shaped front or accumulation bumper 41 having curved ends 42, a channel shaped rear bumper 43 having curved ends 44 and interconnecting side tubes 45 which are rectangular in cross section and are welded to accumulation bumper 41 and rear bumper 43 to produce a rigid rectangular construction. A plate 46 extends between the side tubes 45 intermediate their ends to further rigidify the bumper assembly 40.

As shown in FIGS. 1 and 4, each side tube 45 extends through an opening 47 in the front frame member 16 and an opening 48 in the rear frame member 18. Rollers 49 are mounted with their axes extending horizontally and rollers 50 with their axes extending vertically. The side tube 45 shown in the lower portion of FIG. 1 is guided by two rollers 49 and two rollers 50 near each end, thus providing guiding in vertical and horizontal directions. The side tube 45 shown in the upper portion of FIG. 1 is guided by two rollers 49 near each end, so that it is guided vertically so that binding of the whole bumper assembly during its sliding motion is avoided.

By this arrangement, the front bumper 41 and rear bumper 43 are movable in unison relative to the body of the truck. A tension spring 51 has one end thereof connected to a bracket 52 which extends downwardly from plate 46 and the other end thereof connected to a flange on the transverse member 19 to yieldingly urge the bumper assembly 40 and in turn the accumulation bumper 41 and rear bumper 43 forwardly.

As shown in FIGS. 1 and 4, the front bumper includes a pair of cam plates 53 which extend rearwardly and have inclined cam surfaces 54 that engage a collar 55 on the tow pin to raise the tow pin 11 when the accumulation bumper 41 is moved rearwardly because of an encounter of the accumulation bumper 41 with an obstacle or other obstruction. The plates 53 engage rollers 56 on bracket 27 to guide their movement.

As further shown in FIGS. 4 and 5, each of the rear wheels 25 is provided with a cam operated brake of conventional construction that is operated by a rearward swinging movement of a lever 56. Each lever 56 is hinged to a sleeve 63 which has a bore through which the rod 57 passes. The rearward face of sleeve 63 bears against a nut which is threaded on the rear end of rod 57 and locked in place against accidental turning. As will be described, rearward movement of the bumper 41 not only lifts the tow pin, but also moves rods 57 rearward, thereby applying the brakes on the rear wheels 25 by means of the sleeves 63, springs 62 and levers 56. Each spring 62 is backed up by a collar 64 which is pinned to the rod 57, so that each spring 62 applies the required brake actuating pressure.

Each rod 57 is mounted for reciprocating movement in a transverse plate 58 and is yieldingly urged forwardly by a spring 59 that is compressed between the plate 58 and a stop 60 on the rod. The rod 57 also extends through an angled bracket 61 that is fixed to the underside of the plate 46.

When the front bumper 41 encounters an obstacle and is moved rearwardly relative to the frame of the tow truck, the side tubes 45 carry the plate 46 move rearwardly causing the bracket 61 to engage the stop as shown in dotted lines in FIG. 5 and thereby move the rod 57 rearwardly to engage the brake.

Referring to FIGS. 1, 2, 3 and 6, a shock absorbing and cushioning bumper 65 is mounted for swinging movement on the front of the truck. The bumper 65 is fixed to brackets 66 which, in turn, are fixed to a tube 67. Into each end of tube 67 a stub shaft 68 is placed and welded to the tube. Each stub shaft is turned down to a journal end and is mounted in one of the opposite bores in downwardly extending brackets 69 on the front end of the truck body so as to form bearings for a swinging motion of the bumper 65. A lever 70 extends rearwardly from the tube 67 and a shock absorber 71 has one end thereof connected to the lever 70 and the other end thereof connected to the truck body. A spring 72 is also connected to the lever 70 at one end and to a transverse bar 73 extending between the side rail 17 of the truck body. The shock absorber 71 has a high resistance in extending when the bumper 65 encounters an obstacle and a low resistance in collapsing.

As shown in FIG. 4, each truck includes a fixed rear bumper 75 that extends rearwardly below and beyond the normal position of the movable rear bumper 43. In normal operation, as a succeeding truck approaches a leading truck and the leading truck has not encountered an obstacle, the shock absorbing bumper 65 engages the fixed rear bumper 75 of the leading truck. If, however, the leading truck has encountered an obstacle, the rear bumper 43 of the leading truck will have moved to the dotted line position in FIG. 4 or the solid line position in FIG. 5 and the tow pin 11 of the leading truck will have been lifted and the brakes of the leading truck will have been applied. In this position, as shown in FIG. 5, accumulation bumper 41 of the succeeding truck will encounter the movable rear bumper 43 of the leading truck before the shock absorbing bumper 65 of the succeeding truck encounters the fixed bumper 75 of the leading truck.

As shown in FIG. 6, a control lever 76 which is generally U-shaped is pivoted at one end to a hinge pin in a bracket 87 and has its other end projecting forwardly through an opening 78 in the shock absorbing bumper 65. A tension spring 79 extends between the control lever 76 and a pin 77 on tube 67 to yieldingly urge the free end 80 of the control lever forwardly. A latch lever 81 is pivoted intermediate its ends on a stud on the upper arm of the control lever 76. One end 82 of the latch lever is counterweighted to yieldingly urge the other end 83 upwardly. A latch plate 84 of angle cross section is welded to the front end of the accumulation bumper 41 and extends rearwardly and has a latching surface 85 and notch 86 (FIG. 2).

When a first tow truck is stopped by another truck, by a stop or by any other obstruction, its accumulation bumper 41 is moved backward. The accumulation bumper 41 of a succeeding truck contacts the rear bumper 43 of the first truck and is moved back to lift the tow pin and set the brake of the second truck. During the last part of this motion, the lower fixed bumper 75 of the leading truck is contacted by the lower shock absorbing bumper 65 of the succeeding truck so that the control lever 76 is swung in a counterclockwise direction to the position shown in FIG. 8. This raises the latch lever 81 into locking position.

Figure 2:
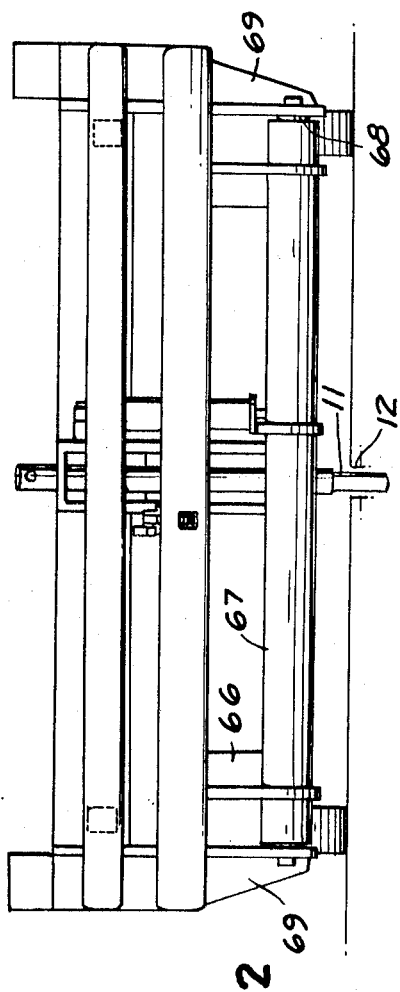
FIG. 2 is a front elevational view of the tow truck.
Figure 3:
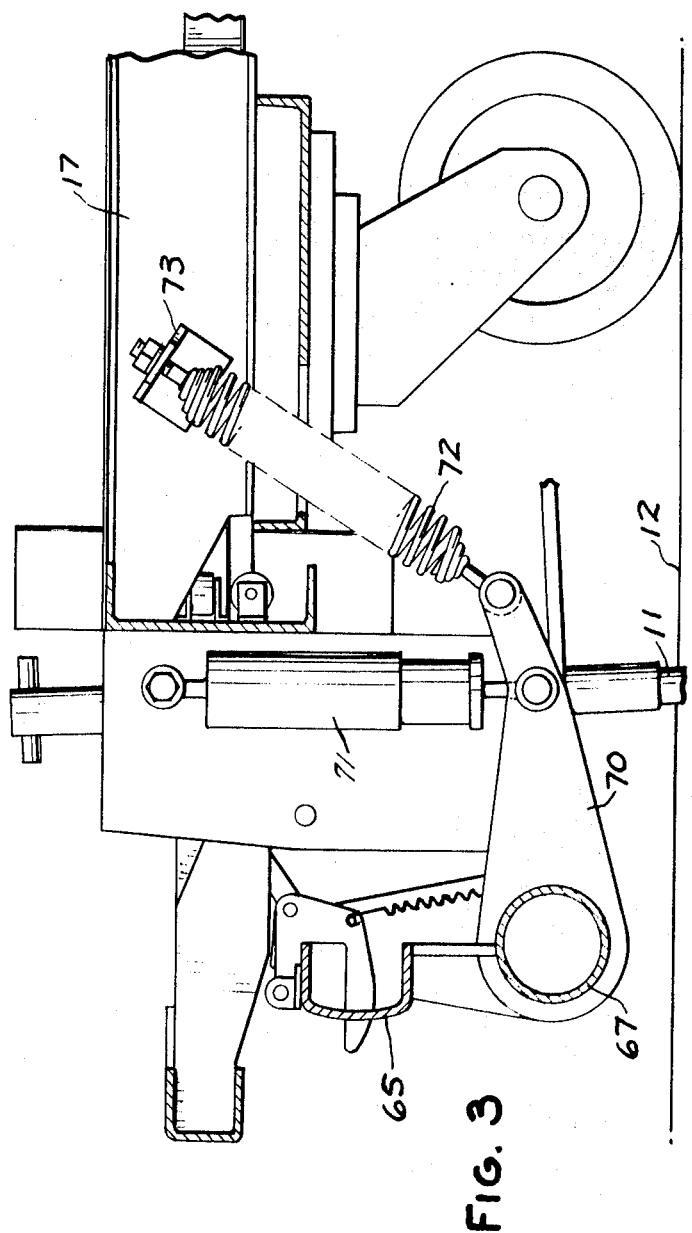
FIG. 3 is a fragmentary sectional view on an enlarged scale taken along the line 3—3 in FIG. 1.

If the leading truck in FIG. 2 is released by the object which stopped it, the accumulation bumper 41 moves forward under the action of spring 51 to drop the tow pin 11 and release the brake, but the leading truck does not move until a chain pusher dog 13 engages its tow pin 11. Although the tip of the control lever 76 exerts a pressure against the lower rear bumper 75, the first truck, even if empty, will not be moved by this pressure which is but a fraction of the force necessary to move the first truck ahead.

As bumper 41 moves forward, bumper 41 of the succeeding truck follows a small distance until notch 86 engages the latch lever 81. In this position, bumper 41 and the tow pin 11 of the second truck are still clear of the chain pusher dogs and the brake of the second truck is still set. Therefore the second truck cannot move or push the first truck forward.

When the first truck is engaged by a chain pusher dog and moves ahead, the control lever 76 of the second truck swings clockwise due to gravity plus spring tension and pulls the pivot of the latch lever 81 downward so that the latch lever 81 collapses in toggle fashion and releases bumper 41 which now is free to move forward, urged by the bumper return spring and brake operating springs. As a result, the tow pin 11 of the second truck is lowered and its brakes are released so that it can be moved ahead by an approaching chain pusher dog.

In this fashion, out of a group of two or more accumulated trucks, only one at a time (the leading one) can have its tow pin lowered and brakes released, the next one following suit only after the first one has moved away. This makes it impossible for the tow pins of several trucks to be lowered simultaneously.

The pushing action of the tow trucks is accomplished as follows: Referring to FIG. 5, the leading truck, if standing free, has its movable rear bumper 43 in the broken line position. The space between it and the accumulation bumper 41 of the following truck is greater than the space between the fixed lower bumper 75 and the cushioning bumper 65. These bumpers 75 and 65 will therefore come in contact first causing the leading, stationary truck to be set in motion with the shock absorbing effect of the cushioning bumper 65. If the latter is pushed back to its limit, the bumper 43 will crowd bumper 41 backward a small distance, but not enough to lift the tow pin, because the cams 54 in FIG. 4 have an initial dwell portion.

If one truck is pushing another, the safety feature of the accumulating bumper is retained. In this case, according to the foregoing, bumper 65 of the second truck is pushing bumper 75 of the first truck. The upper bumper assemblies of both trucks are in the forward position and both tow pins are down. When the leading truck contacts an obstruction other than a free standing truck, its upper bumper assembly is moved backward relative to the truck frame and, in turn, pushes the upper bumper assembly of the trailing truck backward relative to its truck frame until the tow pin of the second truck is free of the chain pusher dog. Now both tow pins are up and the brakes of both trucks are set. After the obstruction is removed, the two trucks are successively set in motion by successive chain pusher dogs as described.

Another feature of the invention is the dual function of the cushioning bumper 65. When accumulating heavily loaded trucks operating at higher speeds and the upper bumper 41 (see FIG. 5) has been crowded back to the position where the lower bumper 75 and cushioning bumper 65 come in contact, the tow pin has been lifted far enough to be clear of the chain pusher dog and the brakes are set. But the approaching truck will travel a few more inches until its energy is absorbed by the brake friction. During this slow-down travel, the cushioning bumper 65 is moved backwards relative to its truck frame and thus helps to brake the truck to a stop. The upper bumper 41 has sufficient overtravel to allow it to move backwards relative to its truck frame during the backward swinging motion of bumper 65. Thus, this cushioning bumper not only softens the impact between a free standing truck and an approaching truck which is to push it, but also aids the brakes of a truck coming to a stop for accumulation.

I claim:

1. In a tow truck conveyor system, the combination comprising at least two trucks adapted to be moved along a slot,
a conveyor adjacent said slot,
each said truck comprising
a truck body adapted to be moved along by the conveyor,
means on said truck body movable into and out of engagement with means on the conveyor,
a front bumper movably mounted on said truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of the successive truck,
yielding means urging said front and rear bumpers forwardly,
and interengaging means on the front of at least each succeeding truck operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the conveyor engaging means on the leading truck,
said interengaging means comprising a control lever pivoted on at least each said succeeding truck and having a portion thereof projecting forwardly for engaging a portion of a leading truck,
a latch lever pivoted to said control lever and having a portion thereof adapted to move into position for limiting the forward motion of the front bumper when the projecting portion of the control lever is engaged to thereby move the latch lever into limiting position.

2. The combination set forth in claim 1 wherein said control lever is generally U-shaped and is pivoted about one arm,
said latch lever being biased so that one end thereof is adapted to be moved into position for engagement with a portion of said front bumper when the control lever engages a portion of a leading truck.

3. The combination set forth in claim 1 including a shock absorbing bumper mounted on the front of said truck and a fixed bumper mounted on the rear of said truck,
said control lever being pivoted to said shock absorbing bumper,
the projecting portion of said control lever being adapted to engage said fixed rear bumper of a leading truck.

4. The combination set forth in claim 3 wherein said fixed bumper projects rearwardly beyond the end of said movable rear bumper when said rear bumper is moved to its forwardmost position under the action of said yielding means.

5. In a tow truck conveyor system, the combination comprising at least two trucks adapted to be moved along a slot,
a conveyor adjacent said slot,
each said truck comprising
a truck body adapted to be moved along by the conveyor,
means on the truck body movable into and out of engagement with means on the conveyor,
a front bumper movably mounted on the truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of the successive truck,
yielding means urging the front and rear bumpers forwardly,
and interengaging means on the front of at least each succeeding truck operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the engaging means on the leading truck,
each said truck having a shock absorbing bumper on the front thereof and a fixed bumper on the rear thereof,
each said shock absorbing bumper having an opening therethrough,
said last mentioned means comprising a control lever pivoted on the shock absorbing bumper of each said truck and having a portion thereof projecting forwardly through said opening in said shock absorbing bumper for engaging the fixed rear bumper of a leading truck,
a latch lever pivoted to said control lever and having a portion thereof adapted to move into position for limiting the forward motion of the front bumper when the projecting portion of the control lever is engaged to thereby move the latch lever into limiting position.

6. In a tow truck conveyor system, the combination comprising at least two trucks adapted to be moved along a slot,
a conveyor adjacent said slot,
each said truck comprising
a truck body adapted to be moved along by the conveyor,
means on said truck body movable into and out of engagement with means on the conveyor,
a front bumper movably mounted on said truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of the successive truck,
yielding means urging said front and rear bumpers forwardly,
and interengaging means on the front of at least each succeeding truck operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the conveyor engaging means on the leading truck,
said last-mentioned means comprising lever means pivoted on the front end of at least each said succeeding truck and adapted to engage a portion of the leading truck, said lever means when so engaged providing means limiting the forward movement of said front bumper of the truck on which it is mounted under the action of said yielding means.

7. In a tow truck conveyor system, the combination comprising
at least two trucks adapted to be moved along a slot,
a conveyor adjacent said slot,
each said truck comprising
a truck body adapted to be moved along by the conveyor,
means on said truck body movable into and out of engagement with means on the conveyor,
a front bumper movably mounted on said truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of the successive truck,
yielding means urging said front and rear bumpers forwardly,
and interengaging means on the front of at least each succeeding truck operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the conveyor engaging means on the leading truck,
said last-mentioned means comprising lever means pivoted on the front end of at least each said succeeding truck and adapted to engage a portion of the leading truck,
said lever means when so engaged providing means limiting the forward movement of said front bumper of the truck on which it is mounted under the action of said yielding means,
said lever means comprising a control lever pivoted on the front of said truck and having a portion thereof projecting forwardly for engaging a portion of a leading truck,
a latch lever pivoted to said control lever and having a portion thereof adapted to move into position for limiting the forward motion of the front bumper when the projecting portion of the control lever is engaged.

8. In a truck for use with a conveyor, the combination comprising
a truck body adapted to be moved along by a conveyor,
means on the truck body movable into and out of engagement with means on the conveyor,
a front bumper movably mounted on the truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of a successive truck,
yielding means urging said front and rear bumpers forwardly,
and means on said truck operable by engagement of said truck with another truck in advance thereof which has encountered an obstacle to engage the front bumper of said truck and prevent forward movement of the front bumper when the rear bumper of a truck in advance of said truck moves forwardly due to the removal of the obstacle in the path of the front bumper of the truck in advance of said truck,
said last-mentioned means being mounted on a forward portion of the truck body.

9. The combination set forth in claim 8 wherein said last-mentioned means comprises lever means pivoted on the front end of said truck and adapted to engage a portion of a leading truck,
said lever means when so engaged providing means for limiting the forward movement of the front bumper of said truck under the action of said yielding means.

10. The combination set forth in claim 9 wherein said lever means comprises a control lever pivoted on the front of said truck and having a portion thereof projecting forwardly for engaging a portion of a leading truck,
a latch lever pivoted to said control lever and having a portion thereof adapted to move into position for limiting the forward motion of the front bumper when the projecting portion of the control lever is engaged.

11. The combination set forth in claim 9 wherein said control lever is generally U-shaped and is pivoted about one arm,
said latch lever being biased so that one end thereof is adapted to be moved into position for engagement with a portion of said front bumper when the control lever engages a portion of a leading truck.

12. The combination set forth in claim 9 including a shock absorbing bumper mounted on the front of said truck and a fixed bumper mounted on the rear of said truck,
said control lever being pivoted to said shock absorbing bumper,
the projecting portion of said control lever being adapted to engage said fixed rear bumper of a leading truck.

* * * * *